United States Patent
Nakano et al.

(10) Patent No.: US 7,292,770 B2
(45) Date of Patent: Nov. 6, 2007

(54) INFORMATION PROCESSING APPARATUS, INFORMATION PROCESSING METHOD, AND PROGRAM

(75) Inventors: Yasuo Nakano, Tokyo (JP); Makoto Urushihara, Tokyo (JP); Takashi Ohkubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 1241 days.

(21) Appl. No.: 10/219,566

(22) Filed: Aug. 15, 2002

(65) Prior Publication Data
US 2003/0035644 A1   Feb. 20, 2003

(30) Foreign Application Priority Data
Aug. 17, 2001   (JP)   ............................ P2001-247748

(51) Int. Cl.
H04N 5/91   (2006.01)
(52) U.S. Cl. ........................ 386/46; 386/83; 386/125
(58) Field of Classification Search ............... 386/45, 386/46, 65, 81–83, 105–107, 109, 111, 112, 386/117, 125, 126; 348/705, 706; 360/61–64, 360/69, 72.1, 72.2, 132; 455/186.1, 186.2, 455/201
See application file for complete search history.

(56) References Cited

U.S. PATENT DOCUMENTS

| | | | | |
|---|---|---|---|---|
| 5,493,455 A | * | 2/1996 | Miyoshi et al. | 360/60 |
| 5,909,421 A | * | 6/1999 | Yatomi | 369/84 |
| 5,943,468 A | * | 8/1999 | Takayama | 386/113 |
| 2005/0207438 A1 | * | 9/2005 | Horiguchi et al. | 370/421 |

* cited by examiner

*Primary Examiner*—John Miller
*Assistant Examiner*—Christopher Onuaku
(74) *Attorney, Agent, or Firm*—Frommer Lawrence & Haug LLP; William S. Frommer; Paul A. Levy

(57) ABSTRACT

An information processing apparatus is disclosed which includes: a retrieving element for retrieving storage medium information and image data information from a memory formed integrally with a storage medium having image data recorded thereon; a recording element for recording to a database the image data information in conjunction with the storage medium information, the image data information having been retrieved by the retrieving element; and a displaying element for displaying the storage medium information and the image data information recorded by the recording element.

8 Claims, 9 Drawing Sheets

FIG. 2A

| CASSETTE SERIAL NO. | UNIIQUE TO EACH CASSETTE TAPE |
|---|---|
| LAST MIC-ID | THE MOST RECENTLY USED MIC-ID. CHANGED WHEN IMAGE DATA ARE ADD TO THE CASSETTE TAPE. |
| CASSETTE LABEL | CHARACTER STRING, DISPLAY ATTRIBUTE, ETC., DISPLAYED AS LABEL OF THE CASSRTTE TAPE |

FIG. 2B

| RECORDING START POINT | LOCATION WHERE RECORDING IS STARTED ON CASSETTE TAPE |
|---|---|
| RECORDING END POINT | LOCATION WHERE RECORDING IS ENDED ON CASSETTE TAPE |
| MIC-ID | UNIQUE NUMBER ASSIGNED TO THE IMAGE DATA |
| RECORDING DATE AND TIME | DATA AND TIME AT WHICH THE IMAGE DATA WERE RECORDED |

FIG. 3

| | CASSETTE SERIAL NO. | LAST MIC-ID | CASSETTE LABEL |
|---|---|---|---|
| a | 0x3567a4ee01 | 0x4800 | KINDERGARTEN GRADUATION CEREMONY |
| b | 0x3567a4ee02 | 0x3294 | SCHOOL ENTRANCE CEREMONY |

FIG. 4
| CASSETTE SERIAL NO. | MIC-ID | RECORDING START POINT | RECORDING END POINT | RECORDING START DATE | RECORDING START TIME | THUMBNAIL |
|---|---|---|---|---|---|---|
| 0x3567a 4ee01 | 0x0001 | 0x37a219 | 0x37ff82 | MARCH 10, 2001 | 9:00:02 | 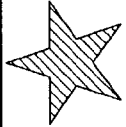 |
| 0x3567a 4ee01 | 0x0002 | 0x3800e2 | 0x3890ef | MARCH 10, 2001 | 9:40:53 | NONE |
| 0x3567a 4ee02 | 0x0001 | 0x2744c8 | 0x27b00e | APRIL 10, 2001 | 8:45:34 | 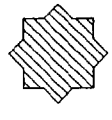 |
c
d
e

FIG. 7

| CASSETTE SERIAL NO. | MIC-ID | RECORDING START POINT | RECORDING END POINT | RECORDING START DATE | RECORDING START TIME | THUMBNAIL |
|---|---|---|---|---|---|---|
| 0x3567a 4ee01 | 0x0002 | 0x3800e2 | 0x3890ef | MARCH 10, 2001 | 9:40:53 | NONE |
| 0x3567a 4ee01 | 0x0003 | 0x39b165 | 0x39f032 | MARCH 10, 2001 | 9:50:00 | NONE |

FIG. 8

```
User_data(){
    user_data_start_code:32bit("0x000001B2")
    neo_id:32bit("0x54534d56")
    search_data_id:8bit("0x01"FOR SEARCH)
    mic_id_LSB:8bit
    mic_id_MSB:8bit
    marker_bit:1bit
    frame_count:7bit(0x00-0x7f)
}
```

FIG. 9
| CASSETTE SERIAL NO. | MIC-ID | RECORDING START POINT | RECORDING END POINT | RECORDING START DATE | RECORDING START TIME | THUMBNAIL |
|---|---|---|---|---|---|---|
| 0x3567a 4ee01 | 0x0001 | 0x37a219 | 0x37ff82 | MARCH 10, 2001 | 9:00:02 | 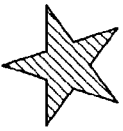 |
| 0x3567a 4ee01 | 0x0002 | 0x3800e2 | 0x3890ef | MARCH 10, 2001 | 9:40:53 |  |
| 0x3567a 4ee02 | 0x0001 | 0x2744c8 | 0x27b00e | APRIL 10, 2001 | 8:45:34 |  |

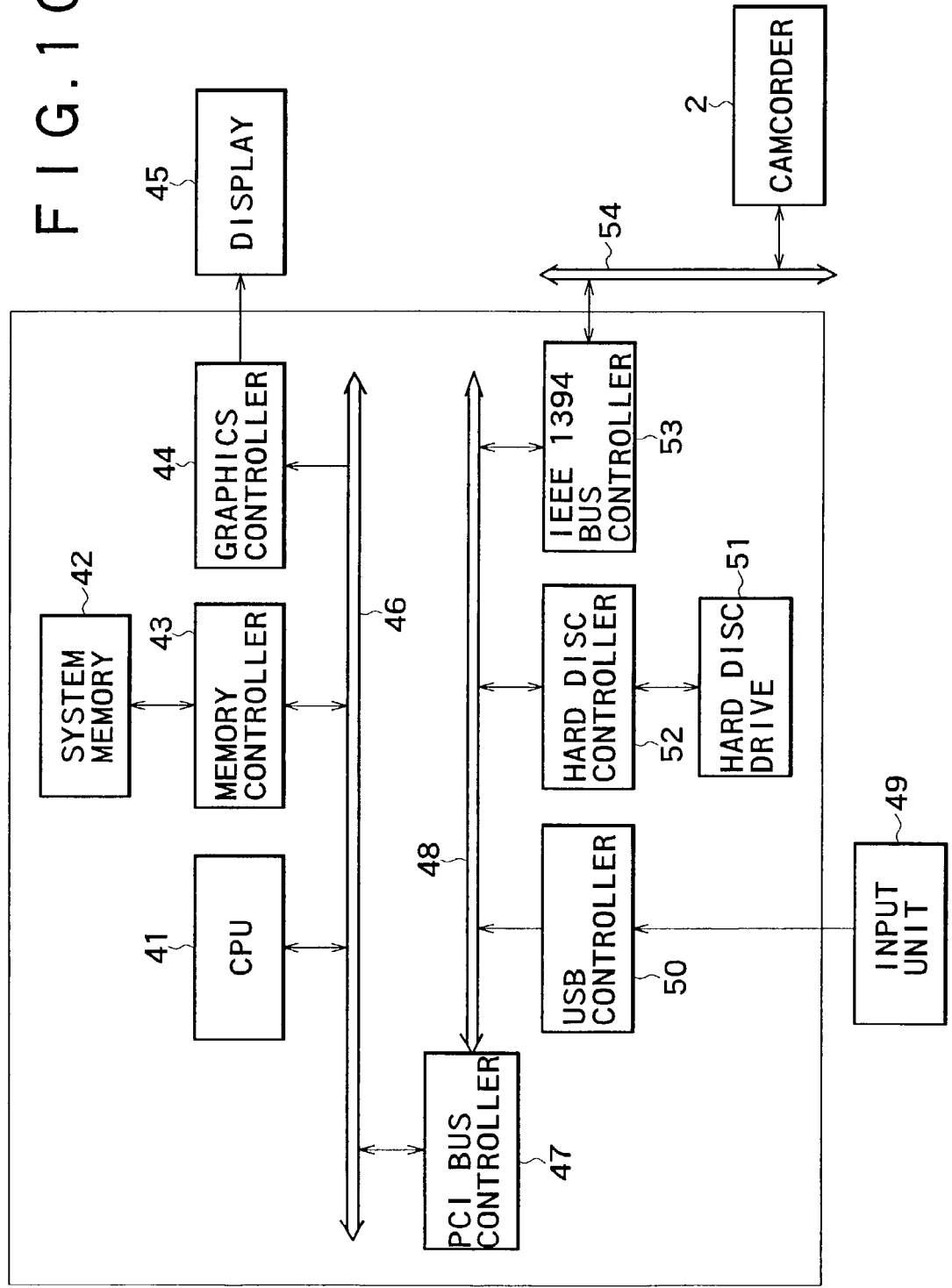

INFORMATION PROCESSING APPARATUS, INFORMATION PROCESSING METHOD, AND PROGRAM

BACKGROUND OF THE INVENTION

The present invention relates to an information processing apparatus, an information processing method, and a program. More particularly, the invention relates to an information processing apparatus, an information processing method, and a program whereby the contents of image data recorded on a storage medium such as a cassette tape are readily verified.

Image data picked up by a digital video camera are recorded on a DVC (digital video camera) cassette tape loaded in the camera. At a later date, a user may wish to verify the contents of the image data recorded on the cassette tape. In such a case, a personal computer may be used to display a list of image data retained on the cassette tape. A program for running the computer for the purpose performs a number of steps: playing back the cassette tape on fast forward so as to acquire the image data therefrom, detecting discontinuities in the acquired image data, and displaying images representative of the discontinuities so as to indicate a list of the image data held on the cassette tape.

One disadvantage of the arrangement above is that the program does not guarantee the quality of the image data reproduced from the tape on fast forward. That is, some data required for detecting the discontinuities can get lost, which makes discontinuity detection inaccurate. Another disadvantage is that if the discontinuities were detected from normally reproduced image data, the detection would be performed with precision but it would take an inordinately long time because the entire range of the cassette tape needs to be played back normally.

Furthermore, when thumbnail (bit map) images are obtained from the image data to represent their contents in a visually easy-to-understand manner, the quality of the thumbnails tends to be poor since they are based on the image data reproduced on fast forward. On the other hand, using the normally reproduced image data to prepare thumbnail images would require too much time.

Although it is possible to enter a list of image data recorded on each cassette tape into a database or like facility, the cassette tape in question cannot be associated automatically with that image data list because cassette tapes are given no unique definition information (i.e., identifiers) in a format readable by a personal computer. To ascertain whether an image data list corresponds to a given cassette tape has so far required that the user visually check the label or other indications on the cassette tape in question. The proceedings have proved bothersome and time-consuming.

SUMMARY OF THE INVENTION

The present invention has been made in view of the above circumstances and provides an information processing apparatus, an information processing method, and a program whereby the contents of image data recorded on a storage medium such as a cassette tape are readily ascertained.

According to an aspect of the present invention, there is provided an information processing apparatus including: retrieving element for retrieving storage medium information and image data information from a memory formed integrally with a storage medium having image data recorded thereon; recording element for recording to a database the image data information in conjunction with the storage medium information, the image data information having been retrieved by the retrieving element; and displaying element for displaying the storage medium information and the image data information recorded by the recording means.

According to another aspect of the present invention, there is provided an information processing method including the steps of: retrieving storage medium information and image data information from a memory formed integrally with a storage medium having image data recorded thereon; recording to a database the image data information in conjunction with the storage medium information, the image data information having been retrieved in the retrieving step; and displaying the storage medium information and the image data information recorded in the recording step.

According to still another aspect of the present invention, there is provided a program for causing a computer to carry out the steps of: retrieving storage medium information and image data information from a memory formed integrally with a storage medium having image data recorded thereon; recording to a database the image data information in conjunction with the storage medium information, the image data information having been retrieved in the retrieving step; and displaying the storage medium information and the image data information recorded in the recording step.

The information processing apparatus, information processing method, and program according to the invention retrieve storage medium information and image data information from a built-in memory of a storage medium containing image data, record the retrieved image data information to a database in conjunction with the storage medium information, and allow the recorded storage medium information and image data information to be displayed. The inventive scheme thus permits easy verification of the contents of image data recorded on the storage medium such as a cassette tape.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 2A and 2B are explanatory views of MIC information acquired by the personal computer of FIG. 1;

FIG. 3 is an explanatory view depicting a typical structure of a database used by the personal computer of FIG. 1;

FIG. 4 is an explanatory view indicating another structure of the database used by the personal computer of FIG. 1;

FIG. 7 an explanatory view of a thumbnail image acquisition list used by the personal computer of FIG. 1;

FIG. 8 is an explanatory view of an MIC-ID detected in step S39 of FIG. 6;

FIG. 9 is an explanatory view illustrating another structure of the database used by the personal computer of FIG. 1; and FIG. 10 is a block diagram showing a typical hardware configuration of the personal computer.

DETAILED DESCRIPTION OF THE PREFERRED EMBODIMENTS

Figure 1:
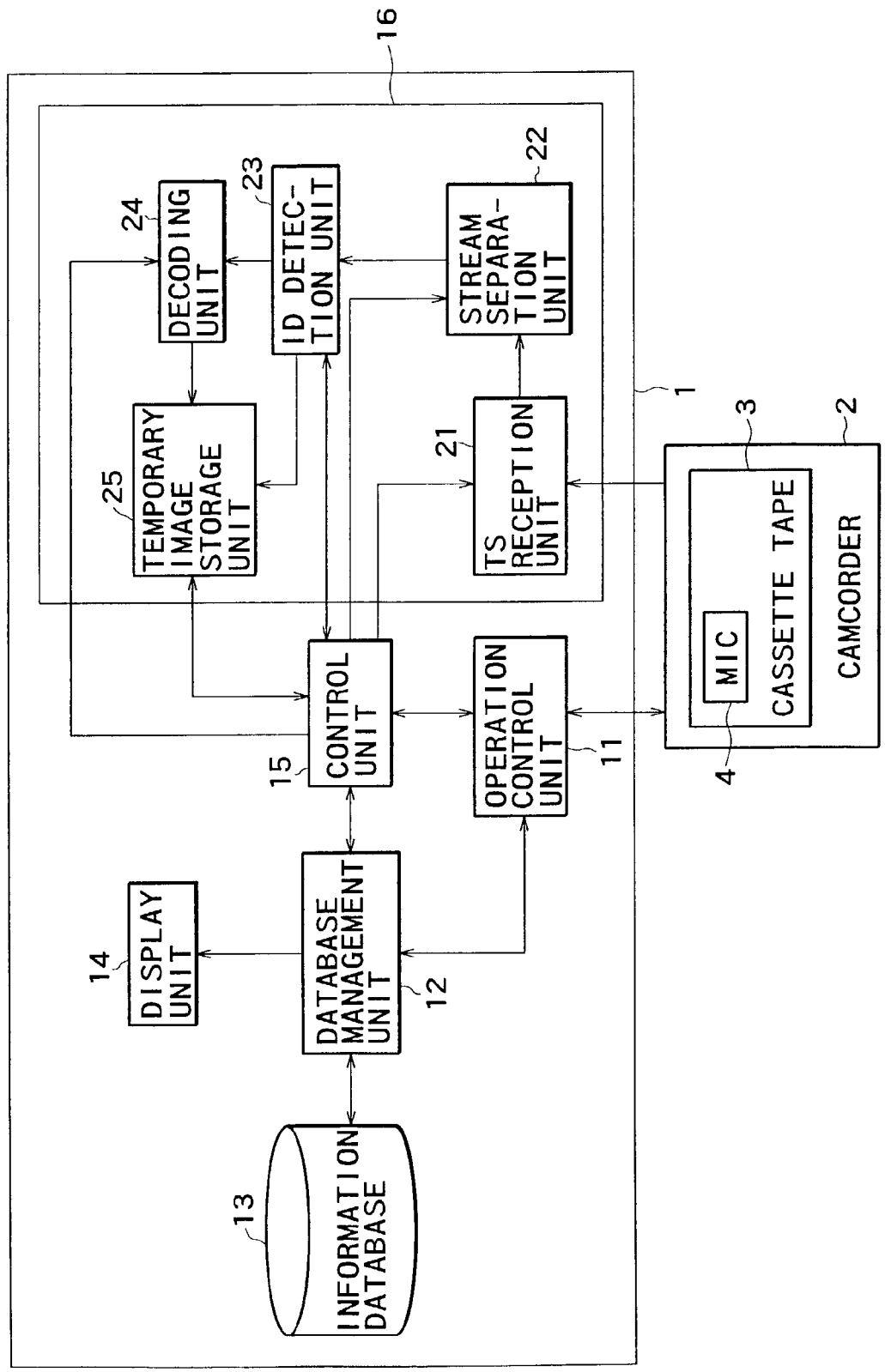
FIG. 1 is a block diagram showing a typical structure of a personal computer to which this invention is applied.

FIG. 1 is a block diagram showing an internal structure of a personal computer 1 that runs an image data information acquisition program (i.e., an application) embodying the invention.

The personal computer 1 works as an image data information acquisition apparatus by running the image data information acquisition program under an operating system such as Windows (registered trademark) 2000. As shown in FIG. 1, the personal computer 1 is connected via an IEEE 1394 bus (shown in FIG. 10) to a digital camcorder (camera-integrated DVTR (digital video tape recorder)) 2 acting as an image pickup/playback device. The camcorder 2 is loaded with a cassette tape 3.

The cassette tape 3 incorporates an MIC (memory in cassette) 4. Image data picked up by the camcorder 2 are recorded on the cassette tape 3. The MIC 4 is constituted illustratively by a flash memory that accommodates information unique to the cassette tape 3 (called the cassette information hereunder) or information about the image data held on the cassette tape 3 (called the image data information hereunder). Details of such information will be discussed later with reference to FIGS. 2A and 2B.

Under control of an operation control unit 11 in the personal computer 1, the camcorder 2 retrieves the cassette information or image data information from the MIC 4 built in the cassette tape 3, and transmits to the personal computer 1 a transport stream of image data retrieved from the cassette tape 3 and compressed by MPEG-2 (Moving Picture Experts Group Phase 2) standards.

The operation control unit 11 communicates with the camcorder 2 in accordance with IEC (International Electrotechnical Commission) 61883-1. Further, the operation control unit 11 monitors the status of the camcorder 2 and controls its operation using a command set described in the AV/C Tape Recorder/Player Subunit Specification, Version 2.1. Furthermore, the operation control unit 11 acquires the cassette information or image data information retrieved by the camcorder 2 from the MIC 4 and supplies what is acquired to a database management unit 12.

Based on the cassette information or image data information from the operation control unit 11, the database management unit 12 searches through an information database 13 for relevant information, or records the cassette information or image data information to the database 13. Further, the database management unit 12 causes a display unit 14 to display information held in the information database 13.

Figure 6:
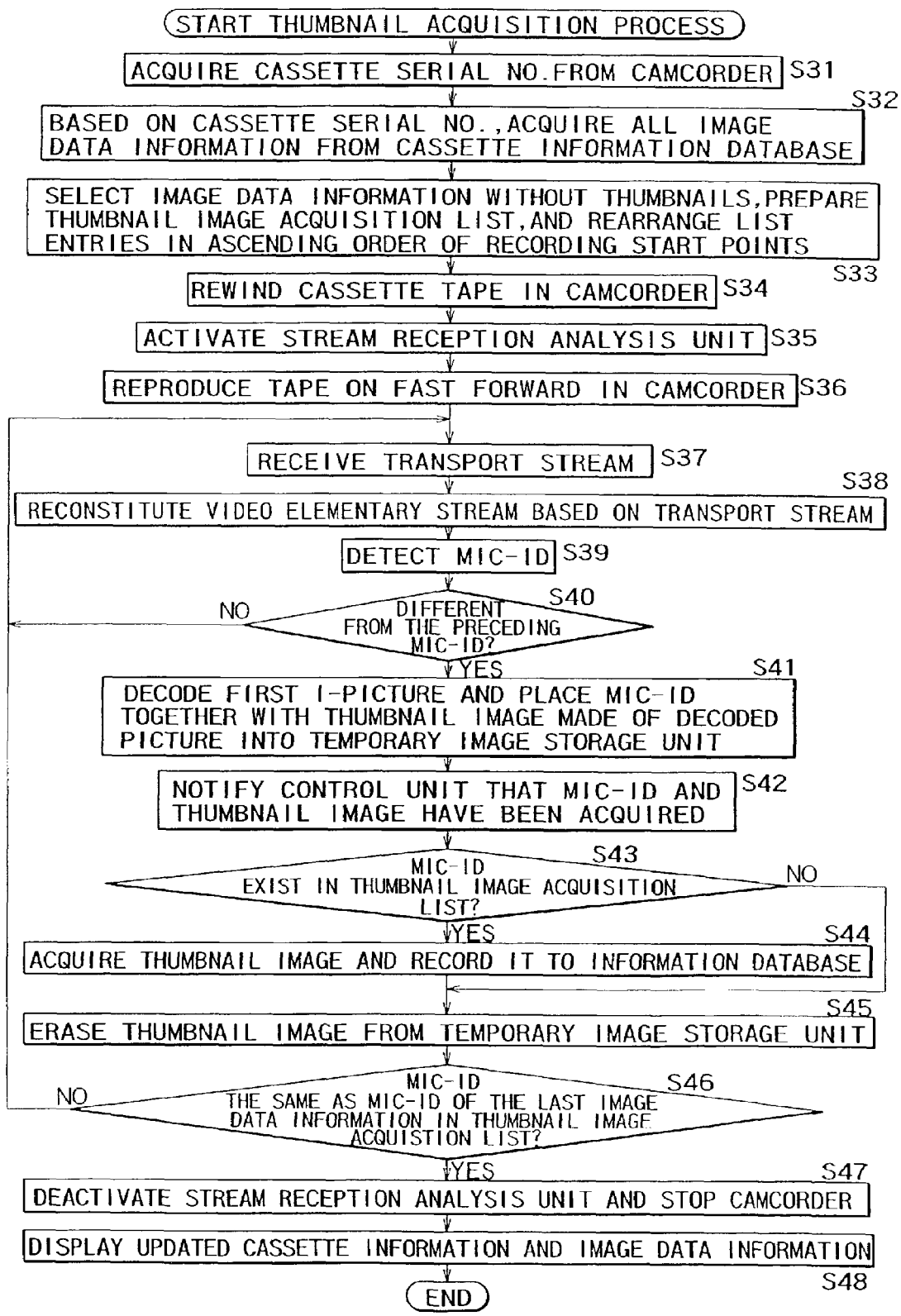
FIG. 6 is a flowchart of steps carried out by the personal computer of FIG. 1 in acquiring thumbnail images.

A control unit 15 controls the personal computer 1 as a whole where thumbnail images are to be acquired from the image data recorded on the cassette tape 3 loaded in the camcorder 2, as will be discussed later with reference to FIG. 6.

A stream reception analysis unit 16 includes a TS (transport stream) reception unit 21, a stream separation unit 22, an ID detection unit 23, a decoding unit 24, and a temporary image storage unit 25. The TS reception unit 21 receives from the camcorder 2 a transport stream composed of compressed MPEG-2 image data (video stream) containing an MIC-ID, and supplies what is received to the stream separation unit 22.

The stream separation unit 22 reconstitutes a video elementary stream (image stream) from the transport stream and feeds the reconstituted stream to the ID detection unit 23. In turn, the ID detection unit 23 detects the MIC-ID (to be discussed later with reference to FIGS. 2A and 2B) from the video elementary stream and compares the detected MIC-ID with the previously detected MIC-ID in order to detect an MIC-ID discontinuity.

The decoding unit 24 decodes an I-picture that appears for the first time after detection by the ID detection unit 23 of the MIC-ID discontinuity from the video elementary stream. The decoded I-picture along with the MIC-ID in effect at that point is stored as a thumbnail image into the temporary image storage unit 25 by the decoding unit 24. Having accommodated the MIC-ID and thumbnail image, the temporary image storage unit 25 notifies the control unit 15 that the MIC-ID and thumbnail image have been acquired.

Described below with reference to FIGS. 2A and 2B is the information held in the MIC 4 incorporated in the cassette tape 3.

The information stored in the MIC 4 (called the MIC information hereunder) is made up of two kinds of information: cassette information shown illustratively in FIG. 2A, and image data information depicted in FIG. 2B.

The cassette information is individualized information about each cassette tape 3. The cassette information includes a cassette serial number, the last MIC-ID, and a cassette label. The cassette serial number is unique to the cassette tape 3 of interest. The last MIC-ID is an MIC-ID (to be described later by referring to FIG. 2B) assigned to the most recently recorded image data among the image data retained on the cassette tape 3. When new image data are recorded to the cassette tape 3, the last MIC-ID is replaced by the MIC-ID allocated to the newly added image data. The cassette label is constituted by a character string and a display attribute displayed as the label of the cassette tape 3. Cassette labels are entered by the user through an input unit 49 such as a keyboard (FIG. 10).

The image data information concerns each of data items making up the image data recorded on the cassette tape 3. The image data information includes a recording start point, a recording end point, an MIC-ID, and a recording date and time. The recording start point refers to that location on the cassette tape 3 from which the image data item in question starts being recorded; the recording end point signifies that location on the cassette tape 3 at which recording of the image data item of interest has ended. The MIC-ID is a unique number assigned to the image data item. The recording date and time are self-explanatory; they indicate the date and time at which the image data item in question was recorded.

Retrieving the MIC information allows the personal computer 1 to acquire the cassette information unique to the cassette tape 3 and the image data information about the image data recorded on the cassette tape 3. The acquired image data information is written to the information database 13 in conjunction with the cassette information.

How the image data information is managed in the information database 13 will now be described by referring to FIGS. 3 and 4.

The information database 13 holds at least a cassette master table shown in FIG. 3 and a recording table depicted in FIG. 4. The cassette master table has the last MIC-ID's and cassette labels arranged in conjunction with cassette serial numbers. The cassette master table in FIG. 3 is shown managing the cassette information (see FIG. 2A) as part of the MIC information. Illustratively, an information item "a" in the table indicates that the cassette tape having a cassette serial number "0x3567a4ee01" has the last (i.e., the most recently assigned) MIC-ID "0x4800" pointing to a cassette tape labeled "Kindergarten Graduation Ceremony."

Meanwhile, the image data information (FIG. 2B) as another part of the MIC information is managed using the so-called recording table as shown in FIG. 4. In the recording table, the image data information is arranged in conjunction with cassette serial numbers. Illustratively, an image data information item "c" in the recording table indicates that an image data item recorded on the cassette tape having the cassette serial number "0x3567a4ee01" is assigned an MIC-ID "0x0001"; that recording of the image data item in question starts at a location "0x37a219" and ends at a location "0x37ff82" on the cassette tape; that the image data item was recorded on Mar. 10, 2001 (recording start date) starting at 9:00:02 (recording start time); and that the image data item includes a star-shaped thumbnail image. By contrast, an image data information item "d" is shown having no thumbnail image.

Given the user's instructions, the database management unit 12 outputs the cassette master table and recording table from the information database 13 to the display unit 14. In turn, the display unit 14 displays the cassette master table and recording table having been received.

Figure 5:
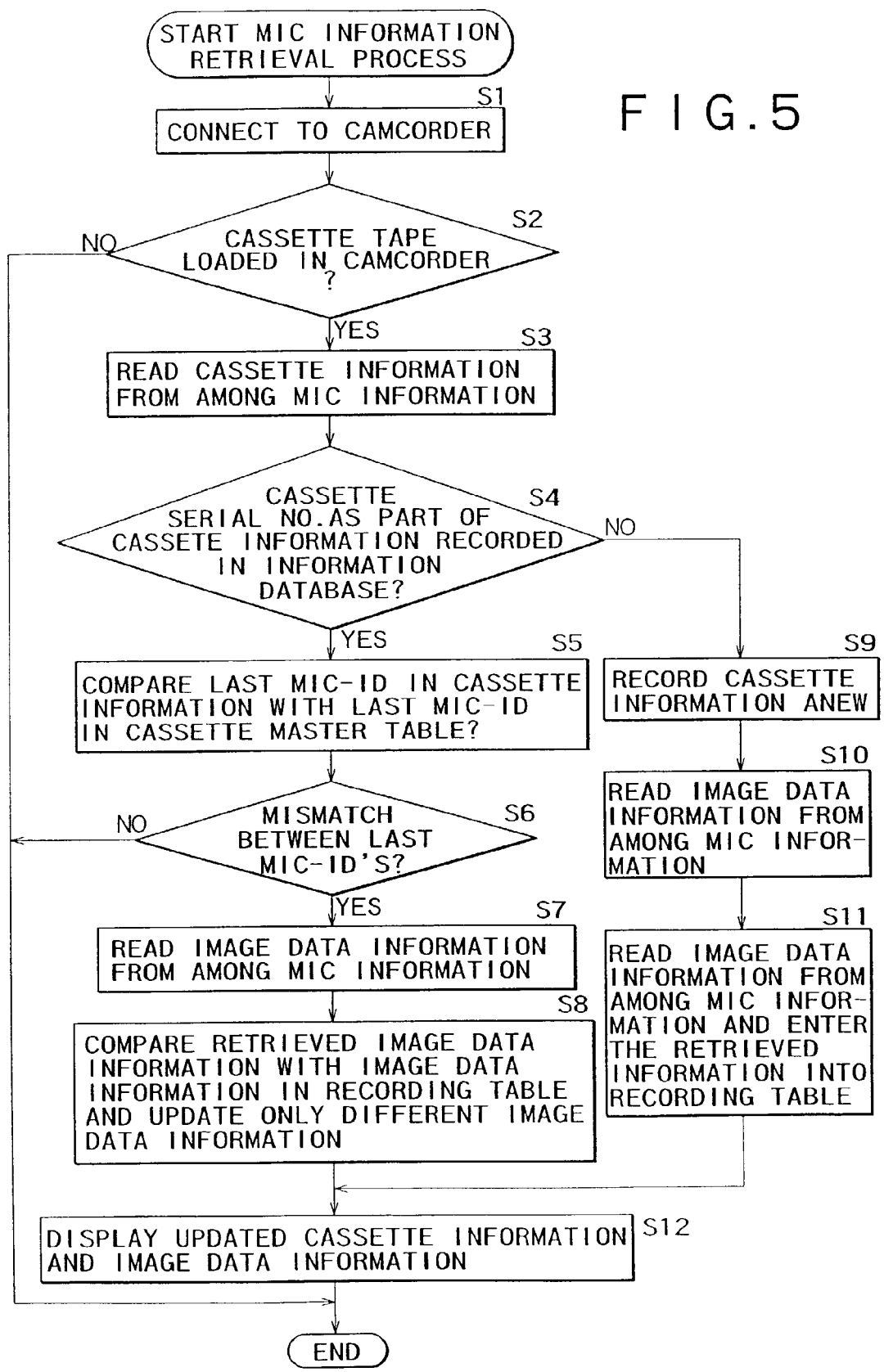
FIG. 5 is a flowchart of steps performed by the personal computer of FIG. 1 in retrieving MIC information.

Described below with reference to the flowchart of FIG. 5 is how an MIC information retrieval process is carried out by the image data information acquisition program running on the personal computer 1. The process is executed every time immediately after the personal computer 1 is booted up.

When the image data information acquisition program is initiated, the operation control unit 11 establishes connection with the camcorder 2 in step S1 and issues a MEDIUM INFO command to the camcorder 2. In response to the command, the camcorder 2 notifies the operation control unit 11 whether or not a cassette tape is loaded inside.

Given the notice from the camcorder 2, the operation control unit 11 judges whether or not the camcorder 2 is loaded with the cassette tape 3 from which to retrieve image data information in step S2. If the cassette tape 3 is found loaded in the camcorder 2, step S3 is reached.

In step S3, the operation control unit 11 issues an OPEN MIC command and a READ MIC command to the camcorder 2. In response to the commands, the camcorder 2 retrieves cassette information (FIG. 2A) as part of the MIC information read from the MIC 2 in the cassette tape 3, and transmits the retrieved cassette information to the operation control unit 11. The operation control unit 11 forwards the received cassette information to the database management unit 12.

In step S4, the database management unit 12 judges whether or not the cassette serial number in the cassette information is already recorded in the information database 13. If the cassette serial number is judged already recorded in the information database 13, then step S5 is reached.

In step S5, the database management unit 12 compares the last MIC-ID corresponding to the cassette serial number in the cassette information read in step S3, with the last MIC-ID in the cassette master table (FIG. 3) retained in the information database 13. In step S6, the database management unit 12 checks to see whether or not the two last MIC-ID's are different.

If in step S6 the last MIC-ID retrieved from the MIC 4 is judged different from the last MIC-ID in the cassette master table already recorded in the information database 13, that means new image data have been added to the cassette tape 3. If that is the case, the database management unit 12 requests the operation control unit 11 to retrieve image data information from the MIC 4.

The request sent by the database management unit 12 to read the image data information from the MIC 4 causes the operation control unit 11 to retrieve the image data information (FIG. 2B) as another part of the MIC information from the MIC 4 in the cassette tape 3 in step S7. The retrieved image data information is supplied to the database management unit 12.

In step S8, the database management unit 12 compares the supplied image data information from the operation control unit 11 with the image data information in the recording table of the information database 13 in terms of their MIC-ID's, and updates only the different image data information. During this MIC information retrieval process, the thumbnail images in the recording table are not updated.

If in step S4 the cassette serial number is not judged recorded yet in the information database 13, the MIC information retrieval process is regarded as carried out for the first time on the cassette tape 3 in question. In that case, step S9 is reached in which the database management unit 12 records anew the cassette information to the information database 13.

In step S10, the database management unit 12 requests the operation control unit 11 to retrieve the image data information from the MIC 4. Given the request, the operation control unit 11 retrieves the image data information as part of the MIC information from the MIC 4 in the cassette tape 3 in step S10. The retrieved image data information is fed to the database management unit 12. In step S11, the database management unit 12 records to the information database 13 the image data information supplied from the operation control unit 11.

Step S12 is reached following step S8 or step S11. In step S12, the database management unit 12 causes the display unit 14 to display the updated cassette master table and recording table.

If in step S2 the cassette tape 3 from which to retrieve image data information is not judged loaded in the camcorder 2, then the operation control unit 11 disconnects connection with the camcorder 2 and terminates the process. At this point, the display unit 14 may be arranged to display an error message.

If in step S6 the last MIC-ID retrieved from the MIC 4 is judged to be the same as the last MIC-ID held in the cassette master table in the information database 13, then the database management unit 12 recognizes that no new image data have been recorded to the cassette tape 3 and that there is no need to update any information in the information database 13. In that case, the database management unit 12 notifies the operation control unit 11 of termination of the process. In turn, the operation control unit 11 disconnects connection with the camcorder 2 and brings the process to an end.

The steps described above allow the user easily to verify and update the contents of the image data recorded on each cassette tape 3, whereby image data management is accomplished more easily than before. Because no processing is performed on the already-retained cassette information and image data information, the time required for information registration is appreciably shortened.

A thumbnail image acquisition process is described below with reference to the flowchart of FIG. 6. This process is carried out on the assumption that the MIC information retrieval process, discussed above by referring to FIG. 5, has already been executed. When the user gives necessary instructions through the input unit 49 such as a keyboard (to be discussed later with reference to FIG. 10), the control unit 15 takes over a major portion of control over the process.

In step S31, the control unit 15 causes the operation control unit 11 to acquire the cassette serial number of the cassette tape 3 from the camcorder 2.

In step S32, the control unit 15 causes the database management unit 12 to acquire, from the recording table (FIG. 4) in the information database 13, all image data information corresponding to the cassette serial number obtained in step S31.

In step S33, the control unit 15 selects only the image data information without thumbnail (bit map) images from all image data information acquired in step S32, and prepares a list such as one shown in FIG. 7. The control unit 15 then rearranges the list entries in the ascending order of their recording start points (the list is called the thumbnail image acquisition list hereunder).

In the thumbnail image acquisition list of FIG. 7, image data information items "d" and "f" are seen associated with the same cassette serial number "0x3567a4ee01" (of the cassette tape 3). The recording start points of the image data information items "d" and "f" are "0x3800e2" and "0x39b165" respectively, indicating that the items of image data information are arranged in the ascending order of their recording start points. It is also shown that the image data information items "d" and "f" have no recorded thumbnail images yet. In FIG. 7, the items or entries whose counterparts are shown in FIG. 4 discussed above are given like reference numerals, and their descriptions are omitted where redundant.

In step S34, the control unit 15 causes the operation control unit 11 to issue a REWIND command to the camcorder 2. Given the command, the camcorder 2 rewinds the cassette tape 3 loaded inside.

In step S35, the control unit 15 causes the stream reception analysis unit 16 to start operating. In step S36, the operation control unit 11 under control of the control unit 15 causes the camcorder 2 to play back the cassette tape 3 on fast forward. The stream reception analysis unit 16, once started, operates continuously until it is instructed to terminate its processing.

With the cassette tape 3 being played back on fast forward in step S36, the camcorder 2 transmits to the personal computer 1 a transport stream of compressed MPEG-2 image data (video stream). In step S37, the TS reception unit 21 receives the transport stream from the personal computer 1 and forwards the received stream to the stream separation unit 22.

In step S38, the stream separation unit 22 reconstitutes a video elementary stream out of the input transport stream. The video elementary stream is supplied to the ID detection unit 23.

In step S39, the ID detection unit 23 detects an MIC-ID from the input video elementary stream. This MICID is written in the format shown in FIG. 8 at a location of "extension and user data (2)" stipulated in the ISO/IEC 13818-2: 1995 6 Video Bit-stream Syntax and Semantics 6.2.

FIG. 8 illustrates a syntax of "user_data( )" recorded in conjunction with an MPEG-2 image data item. In FIG. 8, the second line "user_data_start_code" points to that location on the cassette tape 3 at which this image data item starts being recorded. The third line "neo_id" is an ID representing the camcorder 2 that has recorded the image data item in question. The fourth line "search_data_id" shows that if the value is "0x01," then the image data item is subject to search. The fifth line "mic_id_LSB (least significant bit)" indicates low-order eight bits of the MIC-ID for the image data item in question. The sixth line "mic_id_MSB (most significant bit)" indicates high-order eight bits of the MIC-ID for the image data item. The seventh line "marker_bit" is used to prevent confusion with a start code of MPEG data. The eighth line "frame_count" represents a serial number allocated to an image data item in an image data sequence reproduced from the tape on fast forward. The ID detection unit 23 detects "mic_id_LSB" and "mic_id_MSB" as the MIC-ID.

In step S40, the ID detection unit 23 checks to see if the detected MIC-ID differs from the previously detected MIC-ID. If the two MIC-ID's are judged different, then step S41 is reached. If there is no previously detected MIC-ID (i.e., if the MIC-ID is detected for the first time), the subsequent processing is the same as when the two MIC-ID's are found to differ from each other.

If in step S40 the detected MIC-ID is judged identical to the previously detected MIC-ID, then step S37 is reached again and the subsequent steps are repeated.

MIC-ID's have different values for different cuts of image data and thus represent a discontinuity in case of a mismatch therebetween. A detected MIC-ID discontinuity permits detection of a boundary between different cuts of image data.

If the detected MIC-ID is judged different from the previously detected MIC-ID, step S41 is reached as described above. In step S41, the ID detection unit 23 extracts from the video elementary stream an I-picture that appears for the first time after the detected MIC-ID has been found different from the previously detected MIC-ID, and supplies what is extracted to the decoding unit 24. The decoding unit 24 decodes the received I-picture and reduces in size the decoded picture into a thumbnail image. The thumbnail image along with the detected MIC-ID is sent to the temporary image storage unit 25 for storage.

In step S42, the ID detection unit 23 notifies the control unit 15 that the MIC-ID and the thumbnail image of the image data identified by that MIC-ID have been acquired. In step S43, the control unit 15 judges whether or not the reported MIC-ID exists in the thumbnail image acquisition list prepared in step S33. If the MIC-ID in question is judged to exist already in the list, then step S44 is reached. In step S44, the control unit 15 acquires the thumbnail image corresponding to the MIC-ID from the temporary image storage unit 25, and causes the database management unit 12 to record the acquired image to the information database 13 in conjunction with the MIC-ID in question.

If in step S43 the reported MIC-ID is judged absent in the thumbnail image acquisition list, then step S44 is skipped (the thumbnail image need not be retained because there already exists the thumbnail image in the information database).

In step S45, the control unit 15 erases the thumbnail image held in the temporary image storage unit 25.

In step S46, the control unit 15 judges whether or not the reported MIC-ID is the same as the MIC-ID of the last image data in the thumbnail image acquisition list. If the two MIC-ID's are judged different, that means there still exists a thumbnail image of image data to be acquired. In that case, step S37 is reached again and the subsequent steps are repeated. If in step S46 it is judged that the reported MIC-ID is the same as the MIC-ID of the last image data in the thumbnail image acquisition list (in which image data items are arranged in the ascending order of their recording start points), then step S47 is reached. In step S47, the control unit 15 causes the stream reception analysis unit 16 to stop operating. Also under control of the control unit 15, the operation control unit 11 cause the camcorder 2 to stop playing back the cassette tape 3.

In step S48, the database management unit 12 under control of the control unit 15 causes the display unit 14 to display the updated recording table as shown in FIG. 9. Whereas the recording table of FIG. 4 above was shown having no thumbnail image recorded for the image data information item "d," a square-shaped thumbnail image is seen recorded for the corresponding item in the recording table of FIG. 9. The user can verify the newly recorded thumbnail image by viewing what is displayed on the display unit 14.

As described, the newly recorded image data alone are subjected to the thumbnail image acquisition process whereby an additional thumbnail image is retained in conjunction with the added image data. As opposed to conventional setups that create thumbnail images of all image data, the inventive scheme processes only what is necessary and thereby shortens appreciably the time required for thumbnail image preparation.

Furthermore, utilization of the I-picture extracted from the image data reproduced from the tape on fast forward helps improve the quality of thumbnail images.

FIG. 10 is a block diagram showing a typical hardware configuration of the personal computer described as performing the series of steps above.

In FIG. 10, a CPU (central processing unit) 41 carries out diverse processes based on the programs held in a system memory 42 or on the programs loaded from a hard disc drive 51 into the system memory 42. The system memory 42 also accommodates data needed for the CPU 41 to execute its processes. The system memory 42 is controlled by a memory controller 43. A graphics controller 44 controls a display 45 constituted by a CRT (cathode ray tube) or an LCD (liquid crystal display) for image display.

The CPU 41, memory controller 43, and graphics controller 44 are interconnected via a system bus 46. A PCI bus controller 47 is also connected to the system bus 46.

The PCI bus controller 47 is connected to a PCI bus 48. The PCI bus 48 is further connected with a USB controller 50 for controlling the input unit 49 including a keyboard and a mouse, with a hard disc controller 52 for controlling the hard disc drive 51, and with an IEEE 1394 bus controller 53. The IEEE 1394 bus controller 53 is connected via an IEEE 1394 bus 54 to the camcorder 2. Given suitable instructions, the IEEE 1394 bus controller 53 exchanges control commands and MPEG-2 transport streams with the camcorder 2 over the IEEE 1394 bus 54.

In this specification, the steps which are stored on a storage medium and which describe the programs to be executed represent not only the processes that are carried out in the depicted sequence (i.e., on a time series basis) but also processes that are conducted parallelly or individually.

As many apparently different embodiments of this invention may be made without departing from the spirit and scope thereof, it is to be understood that the invention is not limited to the specific embodiments thereof except as defined in the appended claims.

What is claimed is:

1. An information processing apparatus comprising:
   retrieving means for retrieving storage medium information and image data information from a memory formed integrally with a storage medium having image data recorded thereon;
   recording means for recording to a database said image data information in conjunction with said storage medium information, said image data information having been retrieved by said retrieving means wherein said storage medium information includes any one of an identifier of said storage medium, the last identifier of said image data, and a title entered by a user;
   displaying means for displaying said storage medium information and said image data information recorded by said recording means,
   judging means for judging whether or not the identifier of said storage medium which is retrieved therefrom is the same as the recorded identifier of said storage medium;
   comparing-determining means which, when said judging means judges the retrieved identifier of said storage medium to be the same as said recorded identifier thereof, then compares the retrieved last identifier of said image data with the recorded last identifier of said image data so as to determine if there is a match between the identifiers;
   updating means which, when said comparing-determining means determines that there is a mismatch between said retrieved last identifier of said image data and said recorded last identifier of said image data, then updates recordings in said database based on said image data information retrieved from said storage medium.

2. An information processing apparatus according to claim 1, wherein said image data information concerns each of a plurality of data items constituting said image data recorded on said storage medium, said image data information including any one of an identifier of said image data, a location on said storage medium where said image data are recorded, and a date and a time at which said image data were recorded.

3. An information processing apparatus according to claim 1, wherein, if said judging means judges the retrieved identifier of said storage medium to be different from the recorded identifier thereof in said database, then said recording means records anew to said database said image data information retrieved from said storage medium.

4. An information processing apparatus comprising:
   retrieving means for retrieving storage medium information and image data information from a memory formed integrally with a storage medium having image data recorded thereon;
   recording means for recording to a database said image data information in conjunction with said storage medium information, said image data information having been retrieved by said retrieving means;
   displaying means for displaying said storage medium information and said image data information recorded by said recording means;
   acquiring means for acquiring related data accompanying said image data;
   detecting means for detecting an identifier discontinuity of said image data from said related data acquired by said acquiring means; and
   decoding means which, if said detecting means detects an identifier discontinuity of said image data, then decodes the image data in a predetermined frame immediately after said identifier discontinuity;
   wherein said recording means records the image data decoded by said decoding means, as a thumbnail image in conjunction with said image data information.

5. An information processing apparatus according to claim 4, wherein the decoded image data in said predetermined frame constitute MPEG-compressed I-picture frame image data.

6. An information processing apparatus according to claim 4, further comprising searching means for searching through said database for said image data information and said thumbnail image based on the identifier of said storage medium retrieved by said retrieving means;

wherein said displaying means displays said thumbnail image searched for by said searching means.

7. An information processing method comprising the steps of:

retrieving storage medium information and image data information from a memory formed integrally with a storage medium having image data recorded thereon;

recording to a database said image data information in conjunction with said storage medium information, said image data information having been retrieved in said retrieving step;

displaying said storage medium information and said image data information recorded in said recording step;

acquiring related data accompanying said image data;

detecting an identifier discontinuity of said image data from said related data acquired by said acquiring means; and decoding which, if an identifier discontinuity of said image data is detected, then decoding the image data in a predetermined frame immediately after said identifier discontinuity;

wherein said recording records the decoded image data as a thumbnail image in conjunction with said image data information.

8. A computer-readable medium storing a computer program for causing a computer to carry out the steps of:

retrieving storage medium information and image data information from a memory formed integrally with a storage medium having image data recorded thereon;

recording to a database said image data information in conjunction with said storage medium information, said image data information having been retrieved in said retrieving step; and displaying said storage medium information and said image data information recorded in said recording step;

acquiring related data accompanying said image data;

detecting an identifier discontinuity of said image data from said related data acquired by said acquiring means; and decoding which, if an identifier discontinuity of said image data is detected, then decoding the image data in a predetermined frame immediately after said identifier discontinuity;

wherein said recording records the decoded image data as a thumbnail image in conjunction with said image data information.

* * * * *